(12) United States Patent
Sernee et al.

(10) Patent No.: US 11,135,596 B2
(45) Date of Patent: Oct. 5, 2021

(54) SEPARATION PROCESS WITH SEPARATION MEDIA LOSS REDUCTION

(71) Applicant: Feelgood Metals B.V., Rotterdam (NL)

(72) Inventors: Jelle Sernee, Amsterdam (NL); Jaap Korneel Vandehoek, Rotterdam (NL)

(73) Assignee: Feelgood Metals B.V., Rotterdam (NL)

( * ) Notice: Subject to any disclaimer, the term of this patent is extended or adjusted under 35 U.S.C. 154(b) by 82 days.

(21) Appl. No.: 16/461,745

(22) PCT Filed: Nov. 20, 2017

(86) PCT No.: PCT/NL2017/050754
§ 371 (c)(1),
(2) Date: May 16, 2019

(87) PCT Pub. No.: WO2018/093264
PCT Pub. Date: May 24, 2018

(65) Prior Publication Data
US 2019/0358645 A1 Nov. 28, 2019

(30) Foreign Application Priority Data

Nov. 18, 2016 (NL) ...................................... 2017817

(51) Int. Cl.
*B03C 1/32* (2006.01)
*B03B 1/04* (2006.01)
*B03B 5/28* (2006.01)

(52) U.S. Cl.
CPC .................. *B03C 1/32* (2013.01); *B03B 1/04* (2013.01); *B03B 5/28* (2013.01)

(58) Field of Classification Search
CPC ..... B03C 1/32; B03B 1/04; B03B 5/30; B03B 5/447; B03B 9/061
See application file for complete search history.

(56) References Cited

U.S. PATENT DOCUMENTS

| | | | |
|---|---|---|---|
| 1,871,121 A | 8/1932 | Holmes | |
| 3,362,531 A | 1/1968 | Johnson | |
| 3,483,969 A * | 12/1969 | Rosensweig | B03C 1/32 209/1 |
| 4,252,639 A | 2/1981 | Smith | |
| 5,167,850 A * | 12/1992 | Shtarkman | H01F 1/44 252/502 |

(Continued)

FOREIGN PATENT DOCUMENTS

| | | |
|---|---|---|
| DE | 285229 | 1/1968 |
| EP | 1800753 | 6/2006 |

(Continued)

OTHER PUBLICATIONS

International Search Report from PCT/NL2017/050754 dated Mar. 6, 2018.

(Continued)

*Primary Examiner* — Patrick H Mackey
(74) *Attorney, Agent, or Firm* — Adsero IP

(57) ABSTRACT

The invention is directed to a process for separating particles using a wet density-based separation device, wherein at least part of said particles are coated prior to being fed to said density-based separation device. In accordance with the invention separation medium that is employed in density-based separation processes can be saved.

6 Claims, 1 Drawing Sheet

(56) References Cited

U.S. PATENT DOCUMENTS

| | | | |
|---|---|---|---|
| 5,762,204 A * | 6/1998 | Yang | B03B 5/36 |
| | | | 209/1 |
| 6,254,781 B1 * | 7/2001 | Raj | B03C 1/32 |
| | | | 134/12 |
| 6,994,219 B2 * | 2/2006 | Roth | B03C 1/0332 |
| | | | 209/210 |
| 8,192,630 B1 | 6/2012 | Sjong | |

FOREIGN PATENT DOCUMENTS

| | | |
|---|---|---|
| GB | 302353 | 10/1929 |
| WO | WO 2009/115933 | 9/2009 |
| WO | WO 2014/158016 | 10/2014 |
| WO | WO 2015/050451 | 4/2015 |

OTHER PUBLICATIONS

Search Report from Netherlands Application No. 2017817, dated May 3, 2017.
ISRI (2016) Institute of Scrap Recycling Industries, Inc. "Scrap Specifications Circular", Effective Jan. 21, 2016, pp. 1-58.
Wikipedia (2019) Swarf; Database [Online] Available Web Site: https://en.wikipedia.org/wiki/Swarf; Last update: Dec. 2, 2019; Accessed on: Feb. 7, 2020.

* cited by examiner

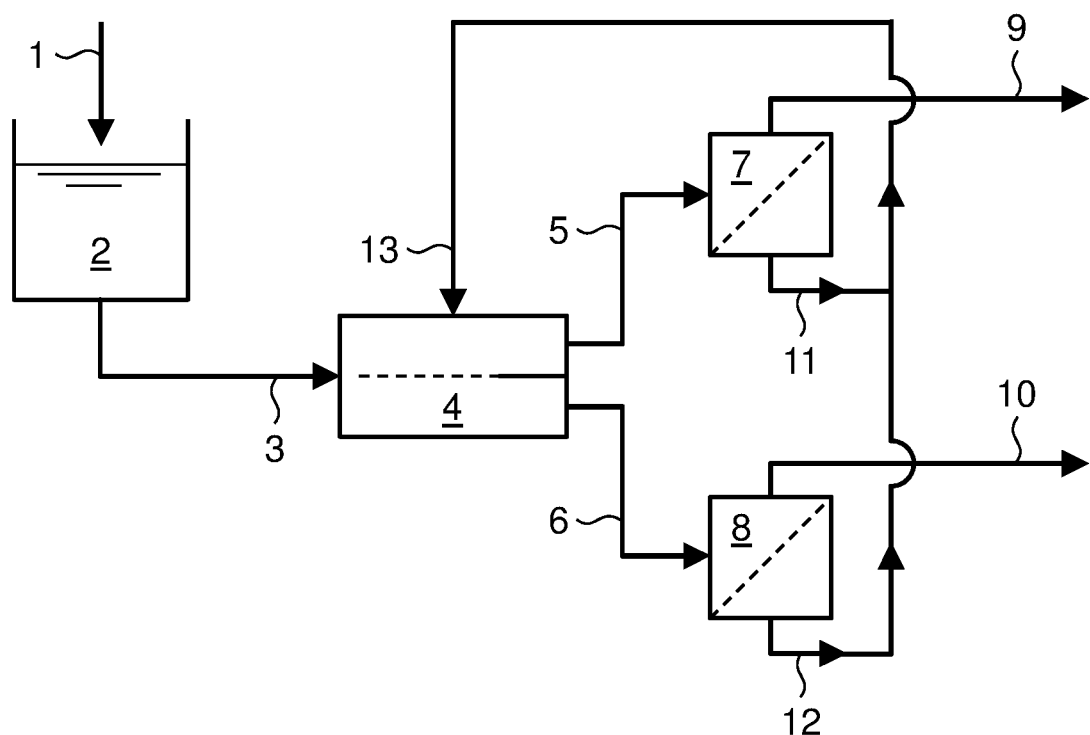

SEPARATION PROCESS WITH SEPARATION MEDIA LOSS REDUCTION

RELATED APPLICATIONS

This application is a 35 U.S.C. § 371 national phase application of PCT/NL2017/050754 (WO 2018/093264), filed on Nov. 20, 2017, entitled "Separation Process with Separation Media Loss Reduction", which application claims priority to Netherlands Application No. 2017817, filed Nov. 18, 2016, which is incorporated herein by reference in its entirety.

BACKGROUND OF THE INVENTION

The invention is in the field of separation technology. More in particular the invention relates to a method and system for wet density separation of raw materials wherein carrier fluid losses can be reduced.

Density separation processes are employed for the classification of mixed streams, like ore separation processes and, more recently, waste streams, containing different components, usually in the form of particles. The different components have different densities, resulting in product streams comprising the individual components in purified or enriched form. The medium that is used to carry out the separation can be either a gas or a liquid (i.e. a fluid). The present invention is in particular directed to density separation using liquid separation media, also referred to as wet density separation.

Typical examples of wet density separation processes are magnetic density separation (MDS) and heavy media gravity separation technology, as well as other density-based separation techniques.

In MDS a magnetic processing fluid (also referred to as carrier fluid) is used as separation medium. A typical example of such a process is described in EP1800753, incorporated herein in its entirety. Other examples are found in WO 2014/158016 and WO 2015/050451, also incorporated herein in their entirety. MDS is used in raw materials processing for the classification of mixed streams into streams with particles of different types of materials. In an accurate form of density separation, a liquid medium is used in which the lighter material float and the heavier materials sink. This process uses as a process liquid a liquid medium that has a density that is intermediate between the density of the light and heavy materials in the feed. In magnetic density separation this is provided using a magnetic liquid. The magnetic liquid has a material density which is comparable to that of water. However, when a gradient magnetic field is applied to the magnetic liquid, the force on a volume of the liquid is the sum of gravity and the magnetic force. In this way, it is possible to make the liquid artificially light or heavy, resulting in a so called cut density. For magnetic density separation, use is made of a large planar magnet. The field decays with the height above the magnet, preferably exponentially with the height above the magnet surface.

The MDS separation medium may be magnetic e.g. by providing a suspension of iron oxide particles. Such a suspension may also be referred to as ferrofluid. A ferrofluid typically comprises stabilized magnetic iron oxide nanoparticles suspended in an appropriate carrier liquid.

The MDS technique is commonly used for separation of light and heavy non-ferrous materials and also for instance in the separation of different types of polymeric materials.

In heavy media gravity separation processes the separation medium (also referred to as "dense medium") is typically based on water of which the density is adjusted by adding the proper type and amount of density-modifier. A typical density-modifier is ferrosilicon (an alloy of iron and silicon with an average silicon content of typically between 15-90 wt. %). In the dense medium sink-float process the carrier fluid typically has a density of about 2.2 to 2.3 $kg/dm^3$.

All known wet density-based separation techniques suffer from the problem of separation media losses, due to adhering fluid leaving the separation process. It is an object of the present invention to solve, at least partly, the problems of the prior art wet density-based separation processes. A further object is to provide an improvement to wet density-based separation processes so that these can be carried out in a more cost-efficient manner.

BRIEF SUMMARY OF THE INVENTION

The invention is directed to a process for separating particles using a wet density-based separation process, wherein at least part of said particles are coated prior to being fed to said density-based separation device. The coating may provide for a water-repellent effect.

The present inventors realized that loss of separation media in liquid density-based separation techniques is a major contribution to operational costs of liquid density-based separation devices. Rather then seeking solutions to this problem by modifying the separation medium itself, the present inventors surprisingly found that it is highly efficient to modify the particles to be separated by providing a coating thereon.

In accordance with the invention separation media can be saved. Unexpectedly, even though separation media still adhered to the separated particles to a degree much comparable to that of uncoated particles (in other words, the so called "drag-out" is just slightly less in accordance with the present invention), it was found easier to remove the separation medium from the separated particles so that the separation medium could be collected and easily recycled to the liquid density-based separation device. Furthermore, in accordance with the invention, the coating material can be chosen such that it does not interfere or causes problems with any further processing of the separated particles, for instance when these are melted. The cost of applying the coating was found to be much lower then the gains of separation media thus obtained, even when none of the coating material could be reclaimed, which is the case for instance when it is burnt off in a subsequent melting step.

BRIEF DESCRIPTION OF THE DRAWINGS

FIG. 1 shows a schematic diagram of a process according to the invention.

DETAILED DESCRIPTION OF THE INVENTION

The present invention can be used with a variety of raw materials as a starting material. Typically the raw materials are a waste stream comprising solid particles, which may be metallic or non-metallic (e.g. mineral or polymeric). Metallic particles can be ferrous or non-ferrous. An example of suitable non-ferrous material is Zorba, which is the collective term for shredded and pre-treated non-ferrous scrap metals typically originating from end-of-life vehicles and waste electrical or bottom ash originating from a solid waste incinerator. The US Institute of Scrap Recycling Industries (ISRI) defines Zorba as a shredded mixed non-ferrous metals consisting primarily of aluminum generated by eddy-current separator or other segregation techniques. Other non-ferrous metals found in Zorba include copper, lead, brass, magnesium, nickel, tin and zinc in elemental or alloyed form. Stainless steel is usually only present in zorba in small quantities. Other suitable types of metal concentrates include bottom ash metal concentrates and electronic scrap mixtures (WEEE scrap metal).

When non-ferrous materials such as Zorba or non-ferrous concentrates from bottom ashes are processed in an MDS installation, a significant amount of the ferrofluid (physically) adsorbs to the surface of the particles to be processed, resulting in an undesired loss of iron particles that are present in the ferrofluid. These iron particles are very small, typically in the range of 10-100 nm.

The adsorption of ferrofluid or other separation media is becoming even more severe when materials having a high specific surface area are processed. The adsorption of separation media is undesired in view of the high costs of ferrofluid and due to the large amounts of washing water that are needed for cleaning the separated product, sometimes requiring multiple cleaning steps.

The same disadvantages are characteristic for other liquid density-based separation methods, such as the heavy media sink-float technology mentioned hereinabove.

As is illustrated in a part of FIG. 1, a typical process according to the invention comprises the steps of:

contacting a stream comprising at least two types of particles having different densities (1) with a coating material (2) that can form a coating to form a stream of coated particles;

feeding said stream of coated particles (3) into a separation medium (4);

followed by allowing said particles to separate based on their density;

followed by collecting said particles as at least two different product streams (5,6).

The step of contacting the feed stream of different particles with a coating material is typically done by submerging the particles in a solution or dispersion of the desired coating material. It is also possible to spray such a solution or dispersion on a stream of particles. This should result in the particles (preferably the majority of the particles, more preferably substantially all particles, viz. more than 95 wt. % of all particles) being covered at least partly on their outside surface with the coating. Preferably more than half of the outside area of the particles is covered by the coating, more preferably more than 90%. Good results are obtained when the material to be coated is fully submerged in a solution of the coating material in such a way that all particles are properly wetted by the solution, but good wetting can also be obtained by spraying. The coating material can also reduce porosity or close the pores of the particles, which effect will be stronger with more porous particles.

Suitable coating materials are stearate, paraffin, waxes, gelatin, various types of oil (mineral or vegetable), diesel fuel, various types of surfactants, as well as combinations thereof. Particularly suitable is stearate, in particular sodium stearate, as is it was found to result in excellent results with respect to separation media consumption, as well as being relatively cheap. Sodium stearate is also favorable because it can be made soluble in water at higher temperatures, while being insoluble in water at room temperature. The other main advantage of sodium stearate is that it is relatively harmless and not toxic like many other liquids with water-repellent properties. (such as diesel oil, etc.). Sodium stearate is particularly favorable when used with MDS processes. The solubility of sodium stearate can be increased by increasing the pH, e.g. by adding a base, such as sodium hydroxide.

Sodium stearate is a surface active agent compound that comprises a hydrophilic part (the carboxylate group) and hydrophobic part (the long hydrocarbon chain). It is widely used in industry as e.g. surfactant or gelling agent. The invention preferably uses aqueous solutions of sodium stearate to produce a coating on the particles to be processed. Without wishing to be bound by theory, the present inventors believe that apart from forming a coating, the sodium stearate solution also fills up the pores and holes of the minerals (such as aluminum oxide/hydroxide particles) and as a result no volume remains for the medium separation media. By result, the coating highly reduces ferrofluid adsorption. In addition, the adsorbed ferrofluid can further be easily removed from the processed material surface and recovered with just one washing step due to the self-cleaning properties of the applied coating.

The non-ferrous material to be processed comprises particles of varying size and shape. In accordance with the invention the particles are for instance washed and then immersed in an alkaline (pH above 10) gelated aqueous solution of sodium stearate to provide them with the coating. Excess sodium stearate solution is allowed to drip off for instance by passing the material over a perforated structure anchor a conveyor belt with perforations, during which at least some of the water will also be allowed to evaporate, resulting in the coating being formed.

After the coating is formed the particles are immersed in the ferrofluid. Then the separation of recycled material (e.g. the MDS based separation) is performed and the excess of ferrofluid is recovered from the processed material on the vibrating sieve.

In a preferred embodiment, sodium stearate coatings are applied by preparing a solution of stearate which forms micelles. This may be done by providing a solution that is above its critical micelle concentration (CMC). Working above the critical micelle concentration has the advantage that a gel is formed once the temperature drops. This improves the possibility of the coating to fill up the holes and pores and remain fixed in the holes and pores. A suitable process for preparing such a solution is to dissolve between 0.5 and 1.6, in particular about 0.8 wt. % sodium stearate at a temperature of above 75° C. In general, when surfactants such as sodium stearate are used as the coating material, it is preferred to form a solution at elevated temperature and a concentration of surfactant that is above the respective CMC.

Typically the stream of coated particles are fed into the separation medium so that they are submerged therein. The separation processes then is carried out in the normal way, viz. the lighter fraction of the particles is allowed to float or move in upward direction, while the heavier fraction is allowed to sink or move in downward direction, so that the two fractions can eventually be separated.

After the two fractions are collected, the separation media adhering to the particles in the at least two different product streams (5,6) can be removed as is illustrated in FIG. 1. This may be done by feeding the streams (5,6) of wet coated particles over a solid-liquid separation device (7,8), e.g. a belt with perforations, optionally provided with vibration means, so that the adhering liquid (11,12) can be removed from the particles. The liquid that is removed in this way can be collected and is preferably recycled (13) to the separation step and the separated particles without or with substantially less separation media (9,10) are obtained.

In accordance with the invention it is possible to obtain a saving in carrier fluid that can be as high as 75% or more. This means that only a quarter or less of the amount of separation medium is consumed in the separation process as compared to a process in which the particles are not coated. For instance, in a typical MDS process the amount of ferromagnetic fluid used may be about 5-6 $dm^3$/metric ton of feed material (1 metric ton is 1000 kg). When the feed particles were coated in accordance with the invention, the amount of ferrofluid was reduced to only about 1.5 $dm^3$/metric ton.

The invention can be used on a variety of feed materials. Particularly suitable are the separation of metal (ferrous or non-ferrous) containing waste streams, copper and aluminum (both in metallic form). Particles sizes are preferably at least 0.1 mm.

Suitable starting streams, in particular when MDS is used are eddy current concentrates from waste processing plants, in particular from bottom-ash thereof; car shredder; so called prosperity scrap (electric and electronic equipment, bicycles, furniture, etc.); and the like. These are typically streams containing non-ferro particles, such as aluminum, zinc, tin, lead, copper, brass, stainless steel, etc. mixed with minerals such as glass. Other suitable waste streams comprise Zorba, Zurik, Twitch, Tweak, Zeppelin, Zebra, and combinations thereof (these terms are ISRI specifications, see for instance http://www.isri.org/docs/default-source/commodities/specsupdate.pdf). Other suitable streams comprise borings and turnings scrap, see e.g. https://en.wikipedia.org/wiki/Swarf.

The invention will now be illustrated by the following non-limiting examples. Unless stated otherwise, all percentages are based on mass.

Example 1

A hot aqueous solution (100 ml) containing 0.3 g of sodium hydroxide and 0.8 g of sodium stearate (approximately 0.8 wt %) was prepared. The solution was then allowed to cool down and turned into a gel within 20 minutes. The mixture of non-ferrous metals and minerals (300 g) was then mixed with the sodium stearate gel. Once mixed, the excess of the sodium stearate was removed with a static sieve. The coated material was then immersed in the ferrofluid. The 60.7 g of ferrofluid with a density of 1.048 $g/cm^3$ was used for the absorption test from which 56.5 g was recovered (6% initially absorbed). The density of the recovered ferrofluid was 1.045 $g/cm^3$. The material was washed with 100 ml tap water which density after washing increased up to 1.006 $g/cm^3$ indicating that adsorbed ferrofluid was removed from the processed material surface. In the next step the ferrofluid was recovered from the water used for washing by means of nanofiltration technique making total losses of carrier fluid less than 1%.

Example 2

Industrial scale tests were performed with the a coating according to the invention as follows. A hot aqueous solution (0.1 $m^3$) containing NaOH (35 g) and sodium stearate (900 g) was prepared. The solution was then allowed to cool down and to form a gel. Four hours after preparation the sodium stearate gel was fed with the pump into a mixing device. Simultaneously a batch of non-ferrous material was delivered to the mixing device. The coated material was collected and stored for processing in an MDS setup. A total of 162 kg of the coated non-ferrous material was processed in the MDS installation. The coated material was immersed in the ferrofluid. An amount of 102 kg ferrofluid with a density of 1.108 $g/cm^3$ was used for the absorption test from which 94.9 kg was recovered with a static sieve (15.7% initially absorbed). The density of the recovered ferrofluid was 1.105 $g/cm^3$. The material was washed with 30 $dm^3$ of tap water, which density after washing increased to 1.047 $g/cm^3$, indicating that adsorbed ferrofluid was removed from the processed material surface. The ferrofluid was recovered from the water used for washing by means of nanofiltration making total losses of carrier fluid less than 2.6%.

The invention claimed is:

1. A process for separating particles using wet density-based separation comprising, coating at least part of said particles with a coating material by preparing a solution of micelles of said coating material and contacting the particles to be coated with said solution prior to being mixed with a ferrofluid and fed to a wet density-based separation device, mixing the coated particles with the ferrofluid and feeding the coated particles into the wet density-based separation device, wherein said density-based separating process is a Magnetic Density Separation (MDS) process, and wherein said coating material comprises a surfactant and is present on at least more than half of the outside area of each coated particle.

2. The process according to claim 1 further comprising the steps of:
   contacting a stream comprising at least two types of particles having different densities coated with the coating material to form a stream of coated particles;
   feeding said stream of coated particles into a separation medium;
   followed by allowing said coated particles to separate based on their density to form separated particles;
   followed by collecting said separated particles as at least two different product streams.

3. The process according to claim 2 which is followed by a step wherein one or more of said product streams is subjected to a step wherein separation media adhering to said separated particles is separated from said product stream.

4. The process according to claim 1, wherein said coating material comprises stearate.

5. The process according to claim 1 wherein the particles to be separated comprise copper, aluminum, zinc, tin, lead, copper, brass, stainless steel, or combinations thereof.

6. The process according to claim 1 wherein the particles to be separated comprise metallic particles comprising at least one of Zorba, Zurik, Twitch, Tweak, Zeppelin, Zebra, WEEE scrap metal, non-ferrous concentrates from bottom ashes, eddy current concentrates from waste processing plants, or combinations thereof.

* * * * *